(12) United States Patent
Hafner et al.

(10) Patent No.: US 7,870,464 B2
(45) Date of Patent: Jan. 11, 2011

(54) SYSTEM AND METHOD FOR RECOVERY OF DATA FOR A LOST SECTOR IN A STORAGE SYSTEM

(75) Inventors: James Lee Hafner, San Jose, CA (US); John Anthony Tomlin, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 10/978,389

(22) Filed: Nov. 2, 2004

(65) Prior Publication Data

US 2006/0107091 A1    May 18, 2006

(51) Int. Cl.
G11C 29/00    (2006.01)

(52) U.S. Cl. .................. 714/770; 714/758; 714/718

(58) Field of Classification Search ................. 714/770, 714/710, 758, 704, 718, 723, 42, 5
See application file for complete search history.

(56) References Cited

U.S. PATENT DOCUMENTS

| | | | |
|---|---|---|---|
| 5,522,065 A | 5/1996 | Neufeld | |
| 5,579,475 A | 11/1996 | Blaum et al. | |
| 5,615,335 A | 3/1997 | Onffroy et al. | |
| 5,774,643 A | 6/1998 | Lubbers et al. | |
| 6,161,194 A | 12/2000 | Tanaka et al. | |
| 6,332,204 B1 * | 12/2001 | Russell | 714/710 |
| 6,560,718 B1 * | 5/2003 | Wilson | 714/5 |
| 6,625,748 B1 | 9/2003 | Tanaka et al. | |
| 6,985,995 B2 | 1/2006 | Holland et al. | |
| 7,043,679 B1 | 5/2006 | Keltcher et al. | |
| 7,058,762 B2 | 6/2006 | Patterson et al. | |
| 7,073,115 B2 | 7/2006 | English et al. | |
| 7,093,157 B2 | 8/2006 | Hajji | |
| 7,155,634 B1 | 12/2006 | Le Graverand et al. | |
| 7,194,467 B2 | 3/2007 | Holland | |
| 7,581,156 B2 * | 8/2009 | Manasse | 714/781 |
| 2004/0260994 A1 | 12/2004 | Winograd et al. | |
| 2005/0283654 A1 | 12/2005 | Wood et al. | |
| 2006/0129873 A1 | 6/2006 | Hafner | |

OTHER PUBLICATIONS

IBM/TDB-ACC-No. NNRD417120: Storage Data Revival System without Extra H/W; Jan. 1999, UK; vol. 42.*

* cited by examiner

*Primary Examiner*—Fritz Alphonse
(74) *Attorney, Agent, or Firm*—McGinn IP Law Group, PLLC

(57) ABSTRACT

A system (and method) for a recovery of data from a lost sector in a storage system, which includes a set of readable and lost sectors in a plurality of disks in the storage system, includes identifying a lost sector of at least one disk of the storage system, determining whether the data from the lost sector is capable of being recovered, and, if the data from the lost sector is capable of being recovered, generating a recovery formula for the lost sector and recovering the data from the lost sector based on the recovery formula.

27 Claims, 6 Drawing Sheets

SYSTEM AND METHOD FOR RECOVERY OF DATA FOR A LOST SECTOR IN A STORAGE SYSTEM

BACKGROUND OF THE INVENTION

1. Field of the Invention

The present invention generally relates to a system and method for recovering data from lost sectors in a storage system (e.g., storage networks, storage nodes, disk array controller, etc.), and more particularly to a system and method for identifying lost sectors, determining which lost sectors have data capable of recovery, and generating formulas for recovering the data from those sectors with recoverable data.

2. Description of the Related Art

Generally, erasure codes (e.g., RAID schemes) are fundamental tools for providing data reliability in storage systems in the presence of unreliable disks. Conventionally, RAID4 and RAID5 systems protect against one disk loss or unaligned sector loss (not more than one sector per horizontal slice). Erasure codes that tolerate two disk failures have begun to be deployed. However, better fault-tolerance will be needed as more systems move to Advanced Technology Attachment (ATA) (e.g., non-Small Computer System Interface (non-SCSI)) drives.

Erasure codes such as RAID4 and RAID5 rely on a single level of redundancy (e.g., see P. Massiglia, The RAID Book, St Peter, Minn.: The RAID Advisory Board, Inc., 1997, which is incorporated herein by reference in its entirety) and so can protect against a single disk failure. Other published algorithms employed by conventional systems and methods are implemented only in the "two disk" loss failure scenario. That is, each specific 2-fault tolerant erasure code generally is published with a specific algorithm for recovery in the "two disk lost" case. More generally erasure codes that tolerate T failed disks are published with descriptions on how to recover the entire data on any T lost disks. Particularly, the Reed-Solomon scheme generally is employed, which uses linear algebra over finite fields to solve the "T disk lost" case. However, this is very complicated and typically requires either additional special purpose hardware or complicated and expensive software.

Though conventional systems recover data from entire lost disks, there is a higher probability that only partial disks have failures. For example, a medium error or hard error on a disk implies loss of access to the data stored only on the failing sector or sectors. A sector loss occurs when the disk containing that sector fails or when the disk returns an error when reading or writing to that sector. In many conventional systems, such sector losses are viewed as disk losses so that the known and published recovery algorithms can be applied. If the sector losses are scattered across the disks, in particular over more disks than the erasure code can tolerate, the published recovery algorithms do not apply. In general, such systems will declare a "data loss event", saying that the data on the lost sectors cannot be recovered from the available data in the system. In some cases, for example RAID4 and RAID5, it is easy to determine if scattered lost sectors have recoverable data or not: if any two lost sectors are on the same horizontal offsets in the disks, then their data cannot be recovered (a data loss event), else the data can be recovered. For all other conventional systems, such determination is neither obvious nor available in the published literature. In general, a data loss event declaration may be made by the system even though certain lost data may in fact be recoverable by a method that goes beyond the published algorithms.

SUMMARY OF THE INVENTION

In view of the foregoing, and other, exemplary problems, drawbacks, and disadvantages of the conventional systems, an exemplary feature of the present invention provides a method and system for determining data recovery formulas for lost sectors in a storage system.

In an illustrative, non-limiting aspect of the invention, the method includes determining a set of readable sectors and lost sectors in a plurality of disks in the storage system, identifying a first lost sector of at least one disk of the storage system, and determining whether data from the first lost sector is capable of being recovered from the data stored on the readable sectors.

If the data from the first lost sector is capable of being recovered, another exemplary aspect includes, for example, generating a first recovery formula for recovering the data from the first lost sector. Thus, if the data from the first lost sector is capable of being recovered, the exemplary method according to the invention can recover the data from the first lost sector.

Other exemplary aspects of the invention include replacing the data from the first lost sector based on a result of the recovery, identifying a second lost sector of the at least one disk of the storage system based on the replaced data from the first lost sector, and determining whether data of the second lost sector is capable of being recovered.

If data of the second lost sector is capable of being recovered, further exemplary aspects of the invention include generating a second recovery formula for the data of the second lost sector, recovering the data of the second lost sector based on the second recovery formula for the data of the second lost sector, and replacing the data from the second lost sector based on a result of the recovery of the data of the second lost sector. The second recovery formula for generating data from a second lost sector can be based at least in part on the recovered data from the first lost sector.

Further, the first lost sector can include lost data including at least one of recoverable lost data and unrecoverable lost data. If the first lost sector includes unrecoverable lost data, the method declares a data loss event.

Another exemplary aspect of the invention is directed to a lost sector data recovery system in a storage system. The lost sector data recovery system, according to an exemplary aspect of the invention, can include means for determining a set of readable sectors and lost sectors in a plurality of disks in the storage system, means for identifying a first lost sector of at least one disk of the storage system, means for determining whether data from the first lost sector is capable of being recovered from the data stored on the readable sectors, and/or means for recovering the data from the first lost sector which is determined to be capable of being recovered.

In another exemplary aspect of the invention, the lost sector data recovery system includes a first determining unit that determines a set of readable sectors and lost sectors in a plurality of disks in the storage system, an identifying unit that identifies a first lost sector of at least one disk of the storage system, a second determining unit that determines whether data from the first lost sector includes recoverable data, a generating unit that generates a first recovery formula for recovering the data from the first lost sector, a recovering unit that recovers the data from the first lost sector based on the first recovery formula, and/or a replacing unit that replaces the data from the first lost sector based on a result of the recovering.

In still other exemplary aspects of the invention, the identifying unit identifies a second lost sector of at least one disk of the storage system. The second determining unit determines whether data from the second lost sector includes recoverable data based at least in part on the recovered data from the first lost sector.

On the other hand, the generating unit generates a second recovery formula for recovering the data from the second lost sector based at least in part on the recovered data from the first lost sector, the recovering unit recovers the data from the second lost sector based on the second recovery formula, and the replacing unit replaces the data from the second lost sector based on a result from the recovering unit, and so on.

One of ordinary skill in the art would understand that the present invention is not limited to identifying only first and second lost sectors and recovering the data from these lost sectors based on the data stored on the readable sectors and/or replaced sectors. The present invention is capable of determining any number of lost sectors and performing recovery and replacement of any such lost sectors based on data stored on the readable sectors and/or replaced sectors or the like.

According to other exemplary aspects of the invention, the storage system can include a storage device, a plurality of storage nodes, a storage network, or a disk array, as well as combinations thereof. The storage system also can include a redundant array of inexpensive disks (RAID) disk array.

In the exemplary aspects of the invention, for example, as set forth above, the first lost sector can include a plurality of lost sectors. For example, the identifying unit can identify a plurality of lost sectors. Further, the step of generating the first recovery formula can implement a binary matrix pseudo-inverse algorithm.

Another exemplary aspect of the invention is directed to a signal-bearing medium tangibly embodying a program of machine-readable instructions executable by a digital processing apparatus to perform the exemplary aspects of the method for a lost sector data recovery in a storage system, according to the present invention.

Yet another exemplary aspect of the invention is directed to a method of deploying computing infrastructure in which computer-readable code is integrated into a computing system, and combines with the computing system to perform the exemplary aspects of the method for a lost sector data recovery in a storage system according to the present invention.

With the unique and unobvious features of the exemplary aspects of the present invention, a novel system and method for determining data recovery formulas for lost sectors in storage systems (e.g., storage networks, storage nodes, disk array controllers, etc.) is provided that solves the problems of the conventional systems and methods.

More particularly, the exemplary aspects of the system and method according to the present invention are capable of identifying lost sectors, determining which lost sectors have data capable of recovery based on a known set (or sets) of readable sectors, and generating formulas for recovering the data from those sectors with recoverable data. Such a structure and method have not been addressed or even contemplated by the conventional systems and methods.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Figure 1:
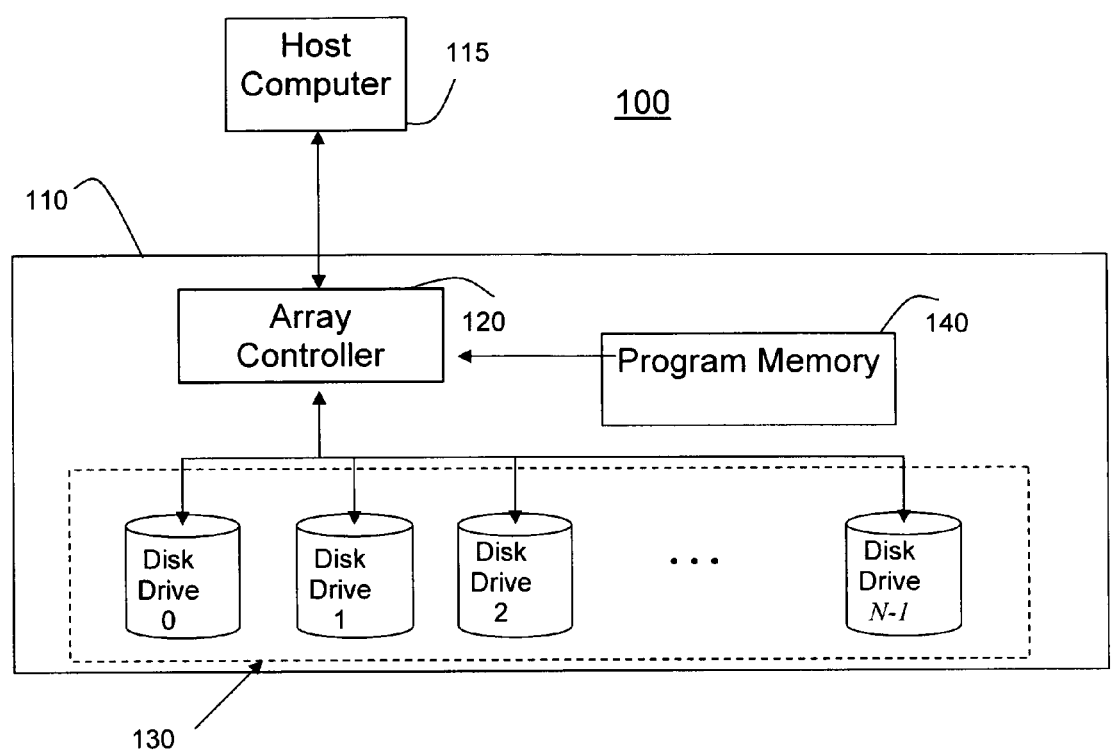
FIG. 1 illustrates an exemplary storage system 100 according to an illustrative aspect of the invention.

Referring now to the drawings, and more particularly to FIGS. 1-6, there are shown exemplary embodiments of the method and systems according to the present invention.

The inventors have discovered several problems with the conventional methods. For example, according to the conventional systems and methods and systems, there exists a problem that the use of the Reed-Solomon scheme is very complicated and generally requires a special purpose hardware or expensive software.

Moreover, the conventional systems and methods only deal with the case of losing two disks (i.e., a two-disk loss) and rebuilding from a two-disk loss, or more generally from T disks where T is the fault-tolerance of the erasure code used in the conventional system. When a conventional system encounters scattered and uncorrelated sector losses, typically it correlates them into disk failures and if the number of affected disks exceeds the correcting power T of the code, the system declares a data loss event.

However, there exists a problem that multi-sector loss across more than two disks (more generally more than T disks) has a significantly high probability of occurrence than correlated failures or loss of entire disks. The conventional systems and methods do not address the problem of loss of a multiple scattered or uncorrelated sectors of more than two disks (more generally, more than T disks).

For example, there may be a loss of a sector on one disk, a total loss of another disk, and a loss of a sector on yet another disk. On the other hand, there may be scattered sector loss across various disks, for example, in a disk array.

The conventional systems and methods treat each of these cases, among others, in the same manner (i.e., as a disk loss). Thus, the conventional systems and methods cannot deal with complicated and uncorrelated patterns of loss.

The exemplary aspects of the present invention provide methods and systems for dealing with complicated and scattered patterns of sector loss, including but not limited to multi-sector loss across more than two disks, total disk loss, etc. That is, the exemplary aspects of the present invention are generally applicable to substantially all cases of disk loss or sector loss.

The exemplary aspects of the present invention can identify the sectors which have not been lost (e.g., media errors), the lost sectors for which the data cannot be recovered and the lost sectors for which the data can be recovered. For the sectors where the data can be recovered, the system and method according to the exemplary aspect of the present invention are capable of generating formulas or algorithms that can be used to recover the recoverable data from lost sectors using information from the sectors which have not been lost.

Thus, the exemplary features of the present invention are applicable to a plurality of storage systems and can provide greatly improved tolerances to various types of failures (e.g., disk failures, sector failures, etc.). For example, the exemplary aspects of the present invention provide a system (and method) for determining optimal or near optimal algorithms for recovering data from lost sectors in storage systems (e.g., disk arrays that use erasure codes such as EvenOdd (e.g., see M. Blaum, et al, "EVENODD: an efficient scheme for tolerating double disk failures in RAID architectures", IEEE Transactions on Computers, vol. 44, pp. 192-202, 1995, which is incorporated herein by reference in its entirety)) that have random sector errors (e.g., errors that are finer grained than full disk loss).

FIG. 1 illustrates an exemplary environment in which a system and associated method (collectively referred to as "the present system" 110) can be implemented. A host computer 115 is connected to an array controller 120 of system 110. The host computer 115 stores data on the array controller 120. The array controller, uses a program or logic extracted from the program memory 140 to determine redundancy values (herein after referred to as parity values) for the data according to the erasure code of the system 110, and stores the data and parity values in the disk drives 130. If sector losses are detected by the array controller 120 when accessing one or more of the disk drives 130, the array controller calls on additional program instructions from the program memory 140 that implements the present system to determine if the data from the lost sectors is recoverable, and if so, determines recovery formulas and recovers the lost data.

Figure 2:
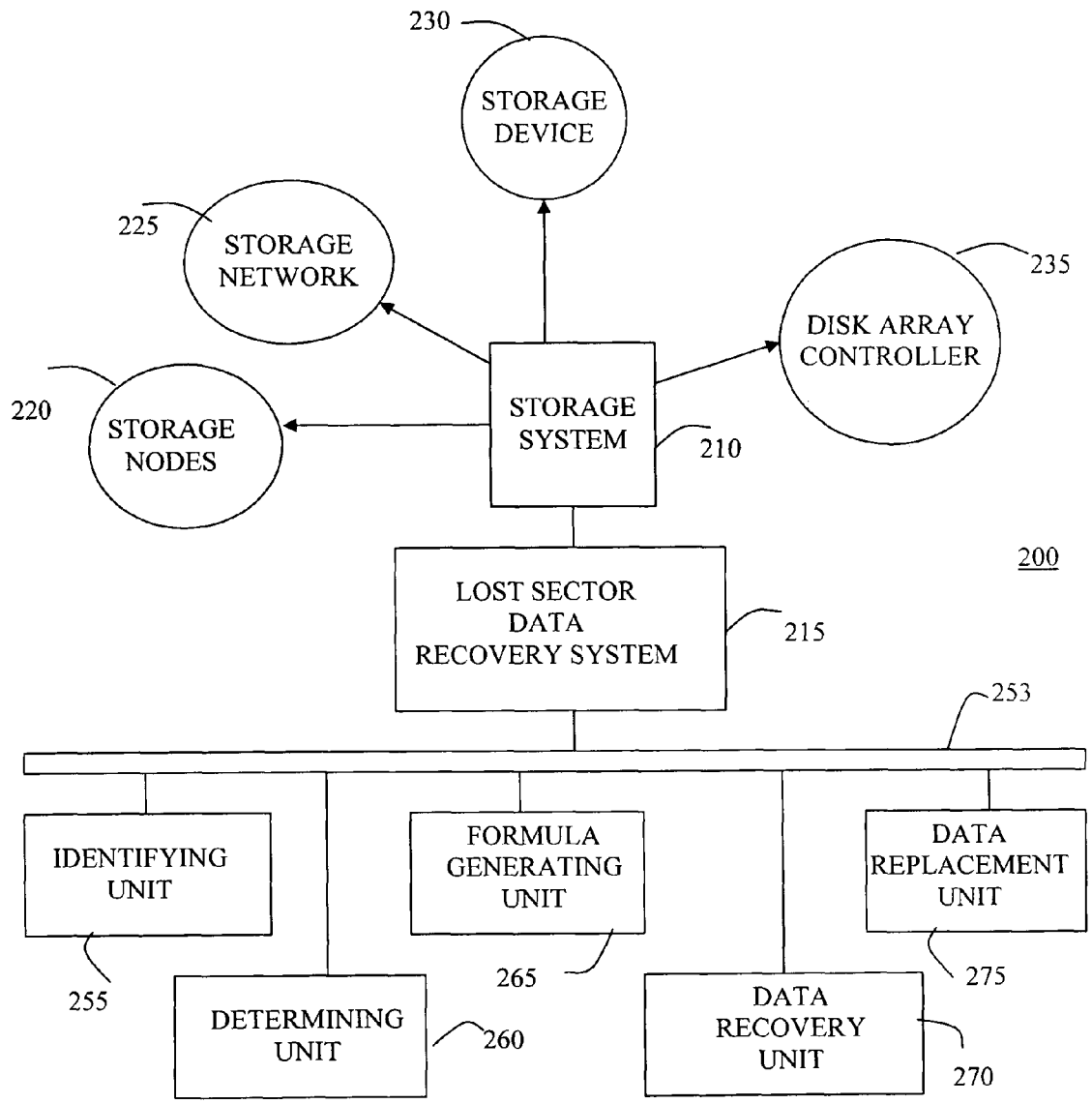
FIG. 2 illustrates an exemplary system 200 according to an illustrative aspect of the invention.

As illustrated in the system 200 of FIG. 2, the storage system according to the claimed invention can exemplarily include one of (or a combination of) a storage device (e.g., 230), a plurality of storage nodes (e.g., 220), a storage network (e.g., 225), and/or a disk array (e.g., see disk array controller 235).

Moreover, the storage system according to an exemplary aspect of the invention can include a redundant array of inexpensive disks (RAID) disk array (e.g., see disk array controller 235), which may include an erasure code that tolerates one or more disk failures.

In an exemplary aspect of the present invention, the recovery formula generating algorithm is capable of implementing a binary matrix pseudo-inverse algorithm.

As illustrated in the exemplary system 200 of FIG. 2, a system of determining data recovery formulas from lost sectors (e.g., lost sector data recovery system 215) in a storage system (e.g., 210) can include means for identifying a lost sector of at least one disk of the storage system (e.g., identifying unit 255) and means for determining whether the data from the lost sector is capable of being recovered (e.g., determining unit 260). Another exemplary aspect of the present invention can include means for recovering the data from lost sectors which are determined to be capable of being recovered (e.g., data recovery unit 270).

Particularly, in one exemplary aspect of the present invention, an identifying unit (e.g., 255) identifies a lost sector of at least one disk of the storage system (e.g., 210). A determining unit (e.g., 260) determines whether the lost sector has recoverable data. A formula generating unit (e.g., 265) generates a recovery formula for the recoverable data of a lost sector. A data recovery unit (e.g., 270) recovers the recoverable data of the lost sector based on the recovery formula. A data replacing unit (e.g., 275) can replace the recovered data, which is obtained by the recovery unit 270, within the storage system for later use. One exemplary method for such replacement is the REASSIGN BLOCKS command in the SCSI Block Commands (e.g., see SCSI Block Commands standard of the American National Standards for Information Technology, which is incorporated herein by reference in its entirety). The identifying unit (e.g., 255), determining unit (e.g., 260), formula generating unit (e.g., 265), data recovery unit (e.g., 270), and replacing unit (e.g., 275) may be coupled together by a bus 253 or the like.

The storage system according to the present invention exemplarily includes at least one of a storage device (e.g., 230), a plurality of storage nodes (e.g., 220), a storage network (e.g., 225), and/or a disk array controller (e.g., 235), etc.

In other exemplary aspects of the invention, the identifying unit (e.g., 255) is capable of identifying a plurality of sector loss (e.g., a plurality of lost sectors on at least one disk, a plurality of lost sectors across a plurality of disks, etc.). Similarly, in other exemplary aspects of the invention, the determining unit (e.g., 260), the formula generating unit (e.g., 265), the data recovery unit (e.g., 270) and/or the data replacement unit (e.g., 275), etc. also are capable of dealing with a plurality of sector loss (e.g., a plurality of lost sectors on at least one disk, a plurality of lost sectors across a plurality of disks, etc.).

As illustrated in the exemplary method of an illustrative aspect of the invention, a method 300 for determining lost sector data recovery formulas in a storage system, includes identifying (e.g., step 305) lost sectors of at least one disk of the storage system, selecting a lost sector, (e.g., step 310) and determining (e.g., step 320) whether the lost sector is capable of being recovered.

According to the exemplary aspects of the invention, if the data from the lost sector is capable of being recovered (e.g., step 320), the method can generate a recovery formula for the data (e.g., step 330), and recover the data (e.g., step 340) of the lost sector. An exemplary method replaces (e.g., see step 350) the data from the lost sector based on a result of the recovery process (e.g., see step 340) and marks the sector as recovered (no longer lost). On the other hand, if the data from the lost sector cannot be recovered, another exemplary aspect of the invention can declare a data loss event for that data. In yet another exemplary aspect of the invention, when the data for the lost sector selected in step 310 has been declared a data loss event or when the data for the lost sector has been recovered and/or replaced, if the system determines (e.g., in step 360) that other lost sectors have not been examined, the system can return to step 310 and select and examine yet another lost sector for possible recovery.

Figure 3:
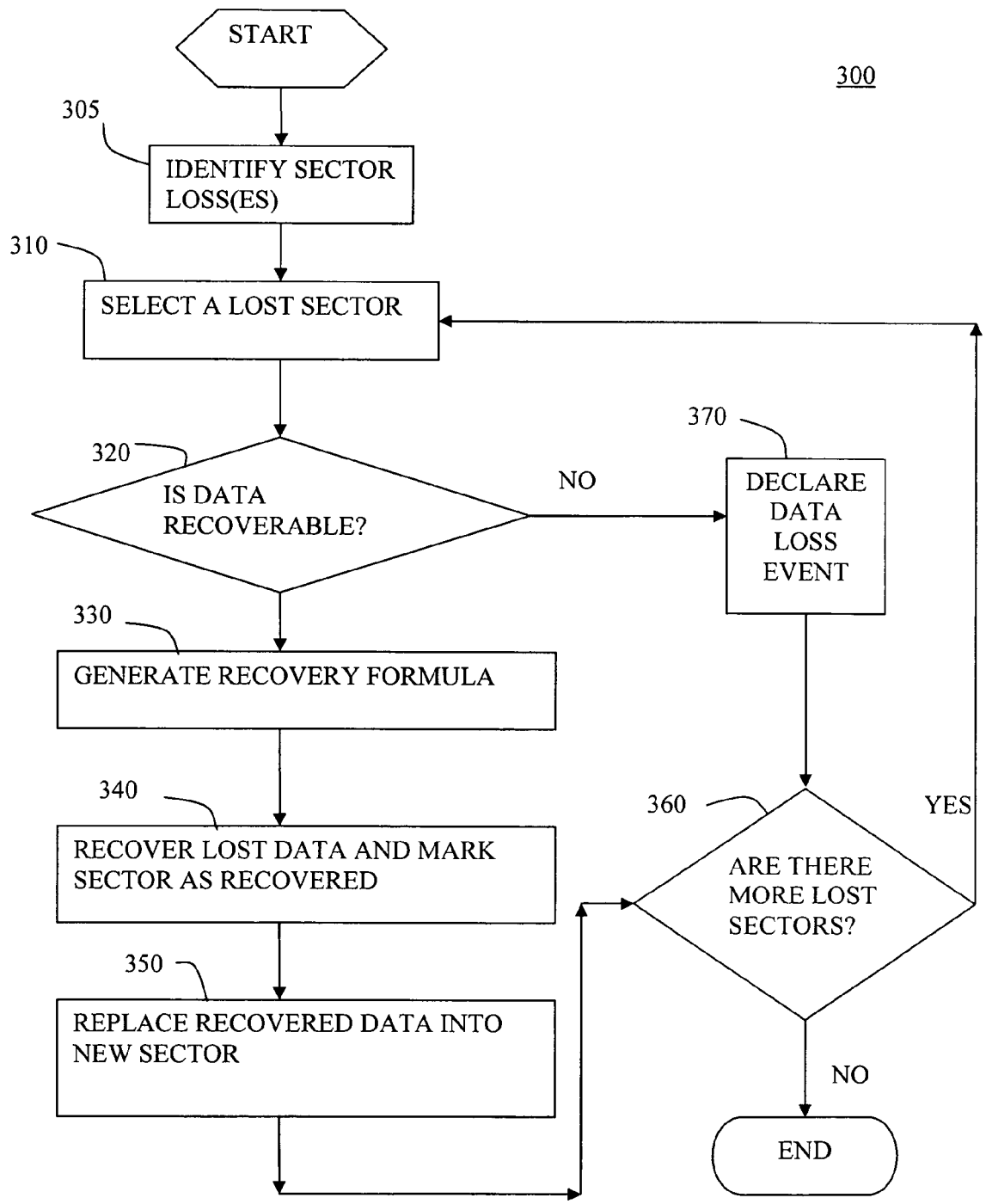
FIG. 3 illustrates an exemplary method 300 according to an illustrative aspect of the invention.

The above exemplary description illustrated in the flowchart of FIG. 3 provides a step-by-step approach to determining the recoverability of lost sectors. As illustrated in yet another exemplary method of an aspect of the invention, a method 400 can be utilized that processes a plurality of lost sectors in batch mode. Process 400 includes identifying (e.g., step 405) lost sectors of at least one disk of the storage system, and determining (e.g., step 410) which of the lost sectors has recoverable data and which does not.

According to the exemplary aspects of the invention, if there are lost sectors with recoverable data (e.g., step 420), the method can generate recovery formulas for the data from the lost sectors (e.g., step 430), and recover the data (e.g., step 440) from the lost sectors based on the recovery formulas (e.g., see step 430). An exemplary method replaces (e.g., see step 450) the data from the lost sectors. On the other hand, an exemplary method of the invention can determine (e.g., step 460) if there are additional lost sectors with unrecoverable data, and can declare a data loss event (e.g., step 470) for this data.

Figure 4:
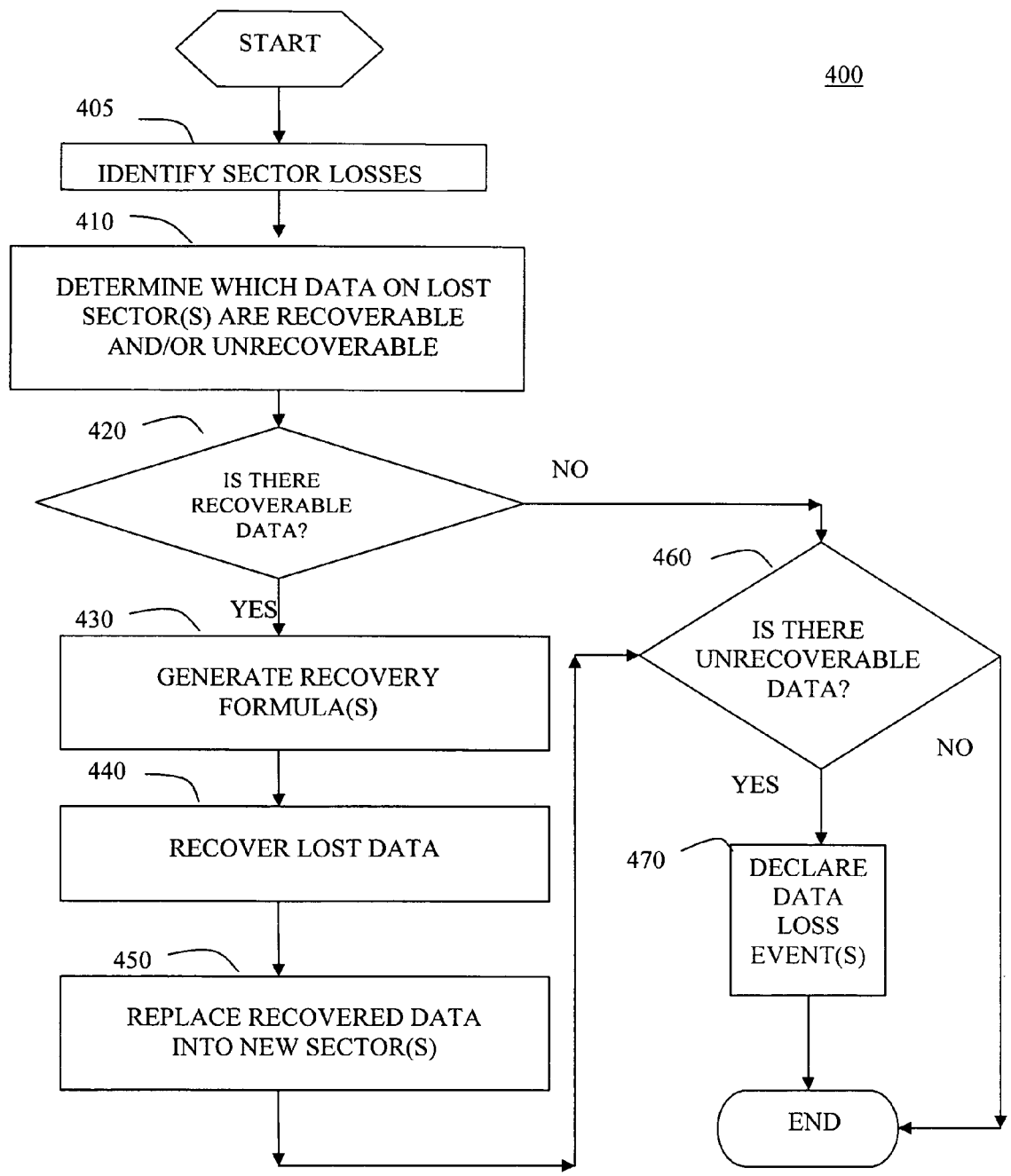
FIG. 4 illustrates another exemplary method 400 according to another illustrative aspect of the invention.

The exemplary descriptions provided above and illustrated in FIG. 3 and FIG. 4 are static (off-line) methods in which the lost sectors are identified in an initial step of the process, and the lost sectors examined either singly (FIG. 3) or in batch-mode (FIG. 4) to determine which lost sectors have recoverable data and which have unrecoverable data.

The present invention can provide also provide two dynamic (e.g., on-the-fly) approaches in which lost sectors are determined in sequence, and recovery formulas for the known and newly detected lost sectors can be updated as new lost sectors are detected. In addition, in an exemplary alternative approach, the results (e.g., recovered and/or replaced data for lost sectors) can be fed (e.g., input, looped, etc.) back into the method. As such, the exemplary method is capable of identifying another lost sector (e.g., a second lost sector, third lost sector, etc., or a plurality of lost sectors) of at least one disk of the storage system and, based on the replaced results, determining whether the other lost sector is (or the plurality of lost sectors are) capable of being recovered.

Figure 5:
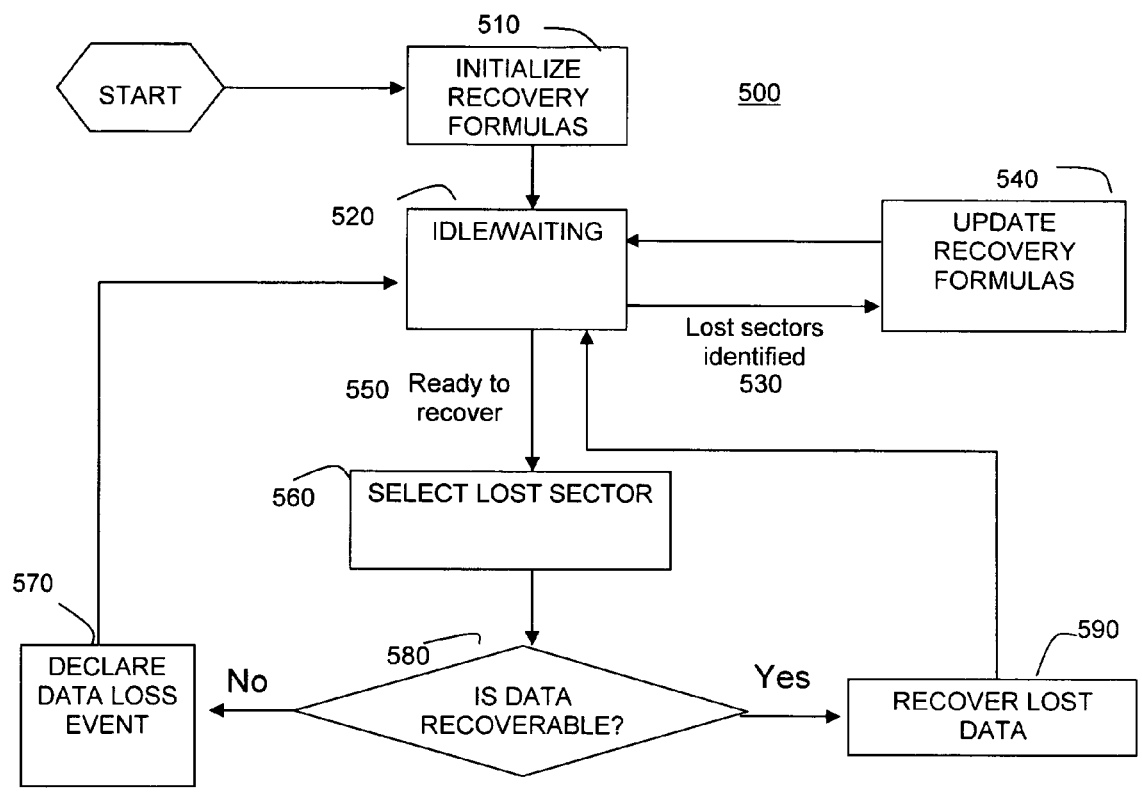
FIG. 5 illustrates yet another exemplary method 500 according to yet another illustrative aspect of the invention.

FIG. 5 provides an exemplary illustration of a first dynamic approach of the present invention. The system first enters an initial state (e.g., state 510) in which the recovery formulas for all sectors and required data structures are initialized. In this state, the system assumes that all sectors are accessible (not lost) so the recovery formula for a specific sector simply indicates a read of that sector. After the initializing step 510, the system enters the idle/waiting state 520. If the system identifies one or more lost sectors 530 (e.g., a read or write attempt to a sector fails with medium error), the system proceeds to update the recovery formulas for the set of current and previously identified lost sector or sectors. The system then returns to the idle/waiting state 520. If the system receives some ready to recover event 550 (e.g., read request, or preemptive recovery command) to start some recovery process, the system selects a lost sector in state 560 and determines in state 580 if the data from the lost sector is recoverable or not. If the data of the selected lost sector is not recoverable, the system declares a data loss event in state 570 and returns to the idle/waiting state 520. If it is recoverable, the system recovers the lost data in state 590 and again returns to the idle/waiting state 520. In this exemplary process, the recovery formulas for lost sectors are not updated when data is recovered for any of these sectors.

Figure 6:
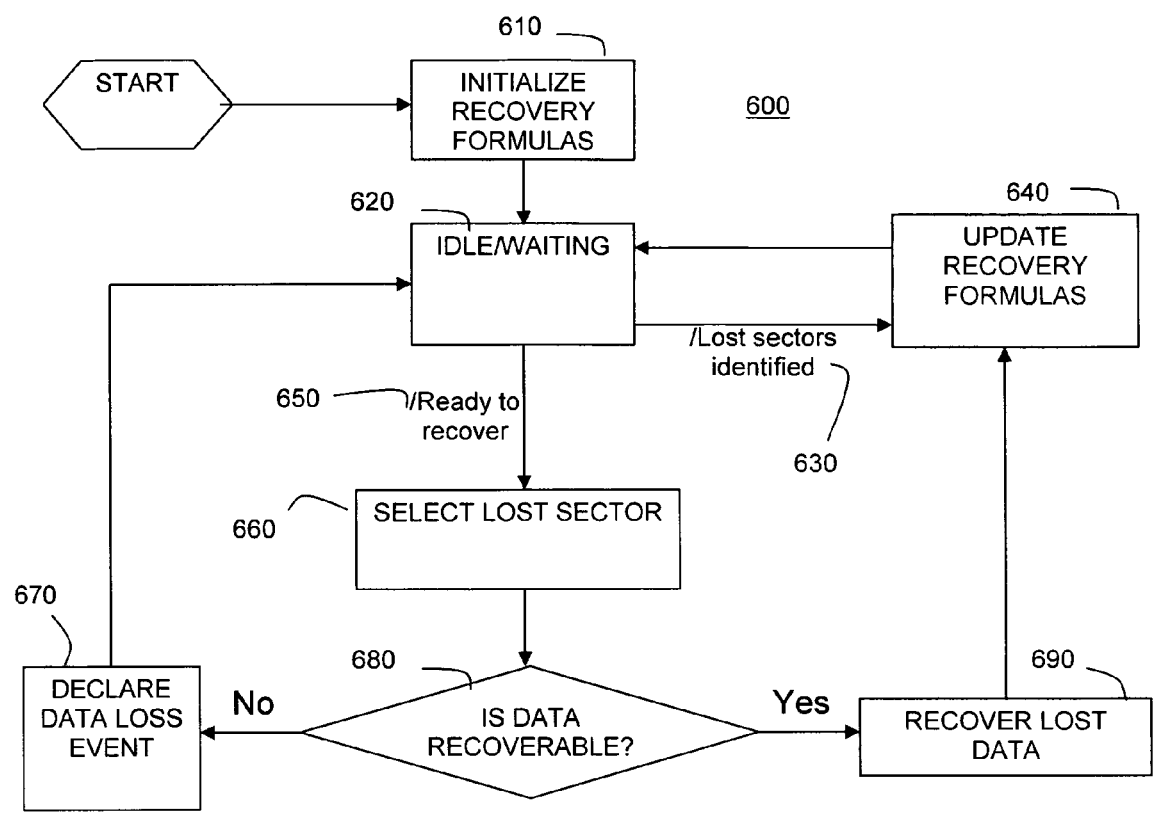
FIG. 6 illustrates a further exemplary method 600 according to a further illustrative aspect of the invention.

FIG. 6 provides an exemplary illustration of a second dynamic approach of the present invention in which the results of recovery can be fed (e.g., input, looped, etc.) back into the method. The system first enters an initial state (e.g., state 610) in which the recovery formulas for all sectors and required data structures are initialized. In this state, the system assumes that all sectors are accessible (not lost) so the recovery formula for a specific sector simply indicates a read of that sector. After the initializing step 610, the system enters the idle/waiting state 620. If the system identifies one or more lost sectors 630 (e.g., a read or write attempt to a sector fails with medium error), the system proceeds to update the recovery formulas for the set of current and previously identified lost sector or sectors. The system then returns to the idle/waiting state 620. If the system receives some ready to recover event 650 (e.g., read request, or preemptive recovery command) to start some recovery process, the system selects a lost sector in state 660 and determines in state 680 if the data from the lost sector is recoverable or not. If the data of the selected lost sector is not recoverable, the system declares a data loss event in state 670 and returns to the idle/waiting state 620. If it is recoverable, the system recovers the lost data in state 690. The system then moves to state 640 where the recovery formulas are updated to reflect the results of the data recovery in state 590. At a minimum, the updated formula for the sector with recovered data will indicate that as a simple read of the sector (as in the initial state 610). In addition, the recovery formulas for other lost sectors may be updated to reflect that the lost sector has it data recovered (e.g., other formulas may now show a dependence on this sector, whereas they could not before). After updating the recovery formulas, the system returns to the idle/waiting state 620.

The ordinarily skilled artisan will recognize that the algorithm used to determine the recovery formulas is not limited to any particular algorithm and can be a different (or the same) algorithm for each lost sector. Those skilled in the art will recognize that other algorithms can be implemented in the exemplary aspects of the present invention, within the spirit and scope of the appended claims. The inventors' intent is to encompass equivalents of such recovery algorithms.

The exemplary aspects of the present invention provide systems and methods for determining optimal or near optimal formulas for recovering lost data in storage systems (e.g., disk array controllers) that have scattered sector errors (e.g., errors that are finer grained than full disk loss). An exemplary aspect of the invention generally is provided for array codes that tolerate 2 disk losses and based on Exclusive-OR (XOR) operations, though the general methods and systems according to the exemplary aspects of the invention are applicable in other cases.

An example in which the conventional systems and methods are insufficient is a case of a disk array controller (typically, employing an erasure code that tolerates at least two disk failures, although that is not a requirement) in which there are, in a given stripe, uncorrelated or scattered medium errors. Array erasure codes that are XOR-based (e.g., not Reed-Solomon) are typically two-dimensional codes (see below).

Unlike the conventional systems and methods, the exemplary aspects of the present invention can determine exactly what lost sectors have recoverable data (as indicated above, those with unrecoverable data are called "data loss events"). For each sector with recoverable data, a formula (XOR equation) can be generated and used to regenerate (e.g., recover) the data from the lost sector.

For a RAID4 or RAID5 array, this problem is quite simple. If there are two or more sector losses in any given row (e.g., sector alignment) within the array, then all lost sectors in that row are data loss events. If there is only one in the row, then that sector can be reconstructed using the RAID5 parity equation.

For higher fault-tolerant array codes, the solution and description is less straight-forward. Generally, the conventional published algorithms and methodologies in these cases have concentrated on the single disk or multiple disk loss cases. When the number of lost disks does not exceed the erasure correcting power of the code, there is always an algorithm, and most code descriptions come with a recovery algorithm. (In many cases, however, that algorithm is designed for complete rebuild of all lost data and generally, it is not clear how this algorithm could be modified to provide efficient means of recovering scattered lost sectors, even when such sectors stay within a number of disks below the correcting power of the code.)

The exemplary aspects of the systems and methods according to the present invention apply in a large number of such situations and cover the case of scattered or uncorrelated sector losses (e.g., including full disk losses as an example of a special case).

One exemplary aspect of the invention is directed to array codes based on XOR that tolerate at least two disk failures though the methods apply for 1-fault tolerant codes such as in RAID5. Among the more well-known examples to which an exemplary aspect of the invention applies are the X-Code (e.g., see L. Xu and J. Bruck. X-code: "MDS array codes with optimal encoding". IEEE Transactions on Information Theory, pages 272-276, 1999, which is incorporated herein by reference in its entirety), BCP codes (e.g., see S. Baylor, P. Corbett, and C. Park. "Efficient method for providing fault tolerance against double device failures in multiple device systems", January 1999. U.S. Pat. No. 5,862,158, which is incorporated herein by reference in its entirety), ZZS codes (e.g., see G. V. Zaitsev, V. A. Zinovev, and N. V. Semakov, "Minimum-check-density codes for correcting bytes of errors". Problems in Information Transmission, 19:29-37, 1983, which is incorporated herein by reference in its entirety), and Blaum-Roth codes (e.g., see M. Blaum and R. M. Roth. "On lowest density MDS codes". IEEE Transactions on Information Theory, 45:46-59, 1999, which is incorporated herein by reference in its entirety).

The exemplary aspects of the invention provide a means to determine, given any set of sector losses in the array, the exact set of such sectors whose data can be recovered and a recovery formula (e.g., for XOR based codes, this is an XOR equation) for the data.

The conventional systems and methods general focus is on Reed-Solomon codes and recovering essentially entire disks, not individual sectors, as with the exemplary aspects of the present invention. Thus, the exemplary aspects of the present invention are more general and can be applied to many more codes.

For purposes of this application, "sector" is defined as the smallest unit of IO to/from (e.g., input/output) a disk.

"Element" is defined as a unit of data or parity. An element is the building block of the erasure code. In coding theory for block codes, this is the data that is assigned to a bit in a symbol. An alternative definition is the maximul unit of data that can be updated (e.g., host write) using the minimal number of disk IO commands, independent of the logical block address (LBA) of the IO.

For one-dimensional codes (e.g., 2-dimensional codes with one row or one bit per symbol), the element corresponds to a strip (which is defined below). Generally, the situation when an element includes multiple sectors can be viewed as multiple independent instances of the code, one for each sector alignment within the elements. Consequently, we can assume for illustrative purposes only that each element corresponds to a sector and hereinafter use the term sector with parenthetical reference to elements where clarity is needed.

"Stripe" is defined as a maximal set of data and parity sectors (more precisely, elements) that are dependently related by XOR (or other redundancy) relations. This is synonymous with "code instance" in that it is a complete instantiation of an erasure code and is independent of any other instantiation. In some cases, this is called a "stride" (which should be not be confused with the term "array" defined below).

"Strip" is defined as a maximal set of sectors (more precisely, elements) in a stripe that are on one disk. This is in contrast to a "disk" because in a collection of disks, one disk may contain strips from multiple stripes. In coding theory, this is the data mapped to a symbol of the code. Within a stripe (code instance), the strip can be uniquely defined as a logical entity stored on some single physical disk in the array. In these terms, the strip may contain both data and parity (some uses of this term limit it to only the data portion).

"Array" is defined as a collection of disks on which one or more erasure codes (or stripes) are instantiated. Each instance may (and should for performance reasons) have a different logical mapping of strip to disk. For example, this is how RAID5 differs from RAID4. Each stripe may have an instantiation of different erasures codes, or the same erasure code.

We describe the present invention in terms of a process or method applied to a single stripe.

Next, an exemplary model that is used to simulate sector losses is described. Sector loss can occur from medium errors or hard errors when the disk attempts to read or write a sector. Sector loss can occur in batches when an entire disk fails (all sectors on the disk are lost at the same time). Whatever the cause, the exemplary method described below applies.

Generator and Parity Check Matrices

The "generator matrix" is one of the most powerful tools for describing an erasure code (and more general codes as well). It converts many questions about the code into problems in linear algebra (over a finite field, typically the binary field) and is in fact the point of view used in the methodology.

This description uses the terminology most applicable to an exemplary aspect to XOR-based erasure codes. The ordinarily skilled artisan would understand how to apply the description to non-XOR-based codes.

The generator matrix has a column block structure, where each block corresponds to a strip and each column within the block corresponds to a sector (more precisely, an element). If the column contains a single 1, then the sector stores user data. Such a column is called an "identity column" because in fact it is a column of an identity matrix. If the column contains multiple 1s, then the sector it corresponds to stores the XOR sum of some set of user data sectors. Such a sector is a parity or redundancy sector (element). In other words, the generator matrix specifies both the data and parity layout on the strips, the ordering of the strips and the equations used to compute parity sectors (elements). An example is given below, but loosely, if D is the row vector of input data sectors, then the product $$K = D \cdot G$$

represents the data and parity sectors that are stored on the disks.

Though it is not a requirement, the generator matrix typically has one column with one 1 for each user data sector that the code instance stores (so that this data is always copied to the sectors verbatim in some strip and can then be read with minimal IO costs, unless a sector is lost). In coding theory terms, a generator matrix of this form is called "systematic".

If there are N data sectors input into the code and P parity sectors computed by the code, then the generator matrix has dimensions $N \times (N+P)$.

A related matrix is the "parity check matrix" of dimensions $(N+P) \times P$. This matrix is typically used in codes on communication channels to detect errors. Each column corresponds to a parity sector. After the data and parity is read off the channel, the parity is XORed with the data as indicated by its corresponding column; the result of this computation is called a "syndrome". If a syndrome is not zero, then there is an error (either in the received parity symbol or in one of the dependent data symbols). For erasure codes in disk arrays, this amounts to a parity consistency check (or parity scrub). In other words, with $K = D \cdot G$ as above, the query $$K \cdot H = = 0$$

is a parity consistency check.

In short, the generator matrix is used to compute the data and parity (and its layout) for storage on the disks. The parity check matrix can be used when all the data and parity are read off the disk (e.g., during parity scrub) to look for errors.

An example is given herein below, and contains a few more observations about these two matrices in general.

The Blaum-Roth Code Example

Consider the Blaum-Roth code BR(3,5) (e.g., see M. Blaum and R. M. Roth. "On lowest density MDS codes". IEEE Transactions on Information Theory, 45:46-59, 1999, which is incorporated herein by reference in its entirety) of parameters p=3 on 5 disks (three data disks). The data and parity layout in the strips and stripe is given in the following diagram:

| S0 | S1 | S2 | P | Q |
|---|---|---|---|---|
| d00 | d01 | d02 | P0 | Q0 |
| d10 | d11 | d12 | P1 | Q1 |

The columns labeled S0, S1, and S2 are the data strips in the stripe; the columns labeled P and Q are the P-parity and Q-parity, respectively. The data sectors are ordered first by strip and then, within the strip, down the columns (this is the same view as the ordering of host logical blocks within the stripe). In this case, N=6 and P=4.

The generator matrix G defined for this code is:

$$G = \begin{pmatrix} 1 & 0 & | & 0 & 0 & | & 0 & 0 & | & 1 & 0 & | & 1 & 0 \\ 0 & 1 & | & 0 & 0 & | & 0 & 0 & | & 0 & 1 & | & 0 & 1 \\ 0 & 0 & | & 1 & 0 & | & 0 & 0 & | & 1 & 0 & | & 0 & 1 \\ 0 & 0 & | & 0 & 1 & | & 0 & 0 & | & 0 & 1 & | & 1 & 1 \\ 0 & 0 & | & 0 & 0 & | & 1 & 0 & | & 1 & 0 & | & 1 & 1 \\ 0 & 0 & | & 0 & 0 & | & 0 & 1 & | & 0 & 1 & | & 1 & 0 \end{pmatrix}$$

This column blocked to indicate the strip boundaries. For example, this indicates that the parity Q0 is the XOR sum of the $1^{st}$, $4^{th}$, $5^{th}$, and $6^{th}$ data sectors, i.e., $$Q0 = d00 \oplus d11 \oplus d02 \oplus d12. \quad (1)$$

The parity check matrix H is:

$$H = \begin{pmatrix} 1 & 0 & 1 & 0 \\ 0 & 1 & 0 & 1 \\ 1 & 0 & 0 & 1 \\ 0 & 1 & 1 & 1 \\ 1 & 0 & 1 & 1 \\ 0 & 1 & 1 & 0 \\ 1 & 0 & 0 & 0 \\ 0 & 1 & 0 & 0 \\ 0 & 0 & 1 & 0 \\ 0 & 0 & 0 & 1 \end{pmatrix}$$

It is noted that the parity check matrix is row blocked exactly to correspond to the column blocks of G and that it contains in the lower portion an embedded identity matrix. It is easy to see that G·H=0; that is, the dot product (in this binary case, the dot product is the sum (modulo 2) of the logical AND of the pairwise components of the two vectors) of any row vector of G and any column vector of H is zero (that is, in mathematical terms they are orthogonal). Each column of the parity check matrix corresponds to a parity value in the array (the identity rows and the block structure provide this association).

For example, the third column of the parity check matrix implies $$d00 \oplus d11 \oplus d02 \oplus d12 \oplus Q0 = 0.$$

If this equation is not satisfied for the actual data and parity read from the disks (or detected on a channel), then an error has occurred somewhere.

Typically, the parity check matrix is written as a matrix of row vectors, that is, as the transpose of the form taken here. The transpose is more convenient for the description of the invention.

As is known to those skilled in the art, these matrices have the following interpretation.

As labeled above, take the data as a row vector (ordered as already indicated):

$$D = (d00, d10 | d01, d11 | d02, d12).$$

The product $$D \cdot G = (d00, d10 | d01, d11 | d02, d12 | P0, P1 | Q0, Q1)$$

indicates the data layout in strips (via the block structure) as well as the formulas for computing the parity (equation (1) is an example). Note that the vectors are on the left and the matrices are on the right.

The parity check matrix implies that $$D \cdot G \cdot H = (d00, d10 | d01, d11 | d02, d12 | P0, P1 | Q0, Q1) \cdot H = 0,$$

regardless of the actual values of the data sectors. That is, for every vector D, it must be the case that D·G·H=0; this can only happen if $$G \cdot H = 0, \quad (2)$$

as matrices.

Any binary linear combination of the columns of H will also be orthogonal to all the vectors in G. For example, the binary sum (XOR) of the first and fourth columns in H written in row form is:

$$(1,1|0,1|0,0|1,0|0,1).$$

It is easy to see that this has the desired orthogonality property. It is also possible to replace any column in H by any such combination and still have a "parity check matrix". In general, the H constructed from the parity equations directly has the minimal number of ones (which is one more than the parity in-degree).

Note that the number of columns of the parity check matrix is exactly the difference between the number of columns and rows of G; and this difference is the number of parity sectors.

Linear Algebra

For purposes of the present invention, "row rank" is defined as the maximum number of linearly independent rows of a matrix. (A set of binary row vectors are linearly independent if no subset sums modulo 2 to the zero vector.)

A matrix is said to have "full row rank" when the row rank of the matrix is equal to the number of rows in the matrix.

The "null space" of a matrix is defined as the set of all (column) vectors that are orthogonal (have zero dot-product) with every row vector of the matrix.

A "null space basis" is defined as a maximal set of linearly independent vectors from the null space. For binary vectors, if the null space basis has P vectors, then the entire null space (excluding the all-zero vector) has $2^P-1$ vectors.

For a code to tolerate $T \geq 1$ failures, the generator matrix G must have two properties:
- it must have full row rank; this is always the case if the matrix is systematic.
- if any T blocks of columns are removed from the matrix, then the resulting matrix must also have full row rank.

The parity check matrix H has the following properties:
- it must also have full column rank (that is a consequence of the requirement for the generator matrix, as well as the fact that the parity check matrix is systematic).
- its column vectors form a basis for the null space of G.
- The entire null space for G is the set of all vectors that can be generated by sums modulo 2 of subsets of vectors from H.

The generator and parity check matrices are the building blocks of the present invention for generating recovery formulas for data on lost sectors, when such formulas exist.

Simulating Sector Loss

The generator matrix provides a set of equations that map the input data (as variables) into the formulas used to compute the sectors as layed out in the strips of the stripe (some formulas are trivial, they just output the data sector itself). Loss of sectors in the stripe can be simulated either by zeroing or by removing the associated columns in the generator matrix. For example, the loss of strip S0 and data sector d02 of the BR(3,5) code above can be simulated by the "zero-ed" matrix G0 of the form:

$$G0 = \begin{pmatrix} x & x & & x & & & & & & \\ 0 & 0 & 0 & 0 & 0 & 0 & 1 & 0 & 1 & 0 \\ 0 & 0 & 0 & 0 & 0 & 0 & 0 & 1 & 0 & 1 \\ 0 & 0 & 1 & 0 & 0 & 0 & 1 & 0 & 0 & 1 \\ 0 & 0 & 0 & 1 & 0 & 0 & 0 & 1 & 1 & 1 \\ 0 & 0 & 0 & 0 & 0 & 0 & 1 & 0 & 1 & 1 \\ 0 & 0 & 0 & 0 & 0 & 1 & 0 & 1 & 1 & 0 \end{pmatrix}$$

where the x label over a column indicates that the corresponding data sector is lost.

Using the data vector D above, it is seen that the revised set of relationships is:

$$D \cdot G0 = K, \quad (3)$$

where $$K=(0,0|d01,d11|0,d12|P0,P1|Q0,Q1).$$

View the vector K as "known" data sectors (in fact, the labeled components represent the sectors that are still good in the stripe); this equation represents a system of linear equations for the "unknown" vector D in terms of the known vector K.

The current invention provides a methodology to construct a matrix R that has two properties:
- R has zeros in all rows corresponding to the lost columns of G0, and
- $G0 \cdot R = I$ (the identity matrix), then multiplying equation (3) on the right by R produces $$D = K \cdot R.$$

The matrix R then provides a set of formulas for recovering (or reproducing) the user data in D: use the formulas implied by the columns of R with input the data from the known sectors to produce the desired components of D. The first property for R guarantees that the lost sectors (zero-ed in K) have no effect on the formulas (that is, are not required).

The following matrices R and R0 have this property:

$$R = \begin{pmatrix} 0 & 0 & 0 & 0 & 0 & 0 \\ 0 & 0 & 0 & 0 & 0 & 0 \\ 0 & 0 & 1 & 0 & 1 & 0 \\ 0 & 1 & 0 & 1 & 0 & 0 \\ 0 & 0 & 0 & 0 & 0 & 0 \\ 1 & 1 & 0 & 0 & 1 & 1 \\ 1 & 0 & 0 & 0 & 0 & 0 \\ 1 & 1 & 0 & 0 & 1 & 0 \\ 0 & 0 & 0 & 0 & 0 & 0 \\ 1 & 0 & 0 & 0 & 1 & 0 \end{pmatrix}, R0 = \begin{pmatrix} 0 & 0 & 0 & 0 & 0 & 0 \\ 0 & 0 & 0 & 0 & 0 & 0 \\ 0 & 0 & 1 & 0 & 0 & 0 \\ 0 & 1 & 0 & 1 & 1 & 0 \\ 0 & 0 & 0 & 0 & 0 & 0 \\ 1 & 1 & 0 & 0 & 0 & 1 \\ 1 & 0 & 0 & 0 & 1 & 0 \\ 1 & 1 & 0 & 0 & 1 & 0 \\ 0 & 0 & 0 & 0 & 1 & 0 \\ 1 & 0 & 0 & 0 & 1 & 0 \end{pmatrix} \quad (4)$$

The columns of R (or R0) correspond to the data sectors as ordered in the vector D. Each row corresponds to a position in the vector K of known sectors. Each column represents an XOR formula for recovering the data on the lost sector to which it corresponds. For example, to reconstruct the data on sector d02, look at the fourth column of R. It indicates the following formula:

$$d02 = d01 \oplus d12 \oplus P1 \oplus Q1,$$

and the fourth column of R0 indicates the formula:

$$d02 = d11 \oplus P0 \oplus P1 \oplus Q0 \oplus Q1.$$

It is easy to see from the original code that both of these formulas are correct (and that they do not depend on any lost sectors).

Note the following observations about these two matrices:
- Each column represents a formula for recovering a component of the data vector D using the known sectors on the stripe.
- Any good (i.e., not lost) data sector in the stripe is represented by an identity column in R; that just means to recover this data from the sector, just read it from the strip.
- The matrices R and R0 have zeros in all rows corresponding to the zeros introduced into G0 to simulate data loss; that means that the recovery formulas have no dependence on the lost sectors.
- The sum (XOR) of column 4 of R and of R0 is orthogonal to G0, that is, it is in the null space of G0.
- The "weight" (number of ones) of the formulas for reconstructing data via R is no more than those for R0, consequently, R is a "better" solution than R0.

The third item above confirms the claim that data loss can be simulated by removing the associated columns from G (rather than zero'ing them out). The matrices R and R0 would simply have the rows of all zeros removed. The "zero-ing" description is given here because it is easier to see the alignment of blocks and indices; that is, easier to see how known data/parity and erasures in the stripe map into the formulas provided by R.

The second item above indicates that in any algorithm (see below) to compute a matrix R with these properties, one can ignore (or assign an identity column to) any column representing known sectors.

Loosely speaking, the new matrix G0 has lost some of its power. In effect, it means that the null space has lost rank (size of basis set): one for each column simulated as lost in G. (This is not strictly true; zero-ing a column in G0 should move mass into the null space basis in the row corresponding to that column (e.g., the vector with a one in this location and zero's elsewhere should now be in the null space). This can be ignored for two reasons: (a) primarily, this is consistent with modeling sector loss as column removal (instead of zero-ing) and (b) these locations should not contribute to recovery formulas so they should be ignored anyway):. Since three columns of G are lost, three basis vectors of the null space must also be lost. That is, the null space of G0 must have exactly one vector in it (it started with four basis vectors in the parity check matrix). The new null space basis for G0 in this example is just the vector (written for convenience in row form):

$$(0,0|1,1|0,1|1,0|1,0). \quad (5)$$

It is in the null space of G0 because there are no dependencies in this vector on the lost data sectors. In addition, adding this column to the fourth column of R produces the fourth column of R0 (that's how R0 was constructed in the first place—this is just the last two items above phrased in different terms). Because the null space in this example has only one vector, there are exactly (and only) two formulas that can be used to recover the data from each of the lost sectors.

As the example shows, the methodology of zero-ing or removing columns of G to simulate data (or parity loss) can apply to any set of sectors, not just to blocks of columns to simulate strip or disk loss. This makes the method completely general for arbitrary sector failure scenarios in the stripe.

In the following subsection, some background linear algebra is given that is the foundation for all the above remarks. This is well-known to those skilled in the art, but is given here for completeness.

Some More Linear Algebra

The matrix R (and also R0) is an example of a "right-inverse" or "right pseudo-inverse" for the matrix G0. A right-inverse of a matrix G is any matrix R such that G·R=I, the identity matrix. If G0 were square, then the R would be the unique inverse. In the example, the dimensions tell us that R is also not unique (as already observed).

Strictly speaking, the term "pseudo-inverse" has been used in the context of matrices with real or complex number entries to have a very specific and unique meaning (it is optimal in a metric sense). The term is overloaded here with a slightly different meaning—it allows for non-uniqueness, however, there is a notion of optimality in this context as well which is described in more detail below.

Linear algebra tells us the following: Suppose G0 is some matrix of full row rank, R is some specific pseudo-inverse of G0 and a B is a basis for the null space of G0. Then, the following formula parameterizes all pseudo-inverses:

$$R+(B \cdot X) \quad (6)$$

where X varies over all matrices (of row dimension equal to the column dimension of B and column dimension equal to that of R). (Here, and in all subsequent matrix equations, the "+" sign means addition in the binary field.) It is easy to see that this has the right property because $$G0 \cdot (R+(B \cdot X))=(G0 \cdot R)+((G0 \cdot B) \cdot X)=I+(0 \cdot X)=I,$$

where I is the identity matrix. This says that R+(B·X) is also a pseudo-inverse regardless of the choice of X. Conversely, varying X, provides all possible pseudo-inverses because any two such pseudo-inverses must differ by something generated from the null space. What X does in equation (6) is add a (different) null space vector (a sum of basis vectors determined by the columns of X) to each column of R. In this way, a new set of recovery formulas, one for each choice of X, are obtained. For the current invention, an optimal R would have minimal weight in each column. So, such an optimal R may be found by finding the right X.

The following algorithm provides a systematic (though potentially very expensive) approach to finding the optimal R.
Algorithm: Improve R
1. Compute all the null space vectors (by taking all possible sums of subsets of the basis vectors).
2. For each non-identity column of R, do the following:
   (a) For each null space vector (from step 1), do the following:
       i. Add the null space vector to the column of R to generate a new formula.
       ii. If the formula generated has lower weight (fewer ones), then replace it in R.
End Of course, this is only practical if the null space has small enough basis set (so the full set is not too large). In the example above, the null space of G0 has only one vector, so this is easy. In general, one can use any subset of the full null space to find better, but perhaps not optimal, pseudo-inverses: in Step 1 above, compute only some subset of the null space.

One simple choice is to use only the basis vectors themselves, or the basis vectors and all pairwise sums. It is an open mathematical question if there are better algorithms for finding the optimal R than that given here.

In the following sections, one algorithm is given in detail and two are outlined that can be used for computing some form of R and a basis for the null space that is well-suited for this purpose. The detailed algorithm is the preferred embodiment, but other algorithms are possible and fall within the scope of this invention.

Pseudo-Inverse Constructions

An algorithm that constructs a pseudo-inverse R is one exemplary implementation of the process step 330 in FIG. 3 or step 430 in FIG. 4 or step 540 in FIG. 5. Such algorithms may be implemented in the formula generating unit 265 of FIG. 2. There are at least four algorithmic models for computing pseudo-inverses and null space bases. Fundamentally, they amount to the same thing, though the data structures and approaches differ somewhat. From now on, the label B is used to indicate a matrix whose columns form a null space basis for some zero-ed matrix G0. The input to the algorithm is the parity check matrix H (or equivalently, the original generator matrix G) and a list F of data or parity sectors which are deemed to be lost (failed) in the stripe. Note that it is not assumed that these are all within one or two strips or that the lost sectors are only data sectors. The methodology is completely general in this regard.

Remark: It is assumed for the sequel that the generator matrix is in the form where the first N columns are an identity matrix and the last P columns form the parity computation formulas and, equivalently, that the parity check matrix has the parity vectors in the first N rows and an identity block in the last P rows. This is not a restriction for systematic codes since it is always possible, for the purposes of these algorithms, to rearrange the columns (by a permutation) to achieve this ordering, keeping in mind that this permutation would naturally also apply to the rows of H and any other matrix whose rows correspond to columns of G. The ordering of the columns of G is really only relevant to two issues which are not of concern to us directly: (a) data placement on strips and stripes and (b) fault-tolerance to loss of strips. The present invention is concerned only with loss of scattered sectors in the stripe, so order is not important.

The output of the algorithm will be two matrices, R and B with the following properties:

- Any identity column in R corresponds to a known data sector.
- Any other non-zero column corresponds to a formula which can be used to recover the corresponding data from a lost data sector using the known data and parity.
- Any all-zero column corresponds to a data loss event—the corresponding data sector is unrecoverable.

In other words, R indicates what sectors have unrecoverable data and what sectors have recoverable data. In addition, R also provides a recovery formula when one exists. The matrix R does not necessarily contain the optimum (least cost) formulas for recovery. The matrix B is a basis for the null space of the zero-ed generator matrix. If necessary or desirable, B can be used to improve the formulas in R as indicated in the previous section.

The algorithm uses "column operations" and/or "row operations" to manipulate matrices. Elementary column/row operations come in two forms (simplified for the present description):

Swap: swap two columns (or rows)
Sum and Replace: add column c to column d (modulo 2) and replace column d with the sum (similarly for rows).

Column-Incremental Construction

The algorithm presented here in detail is an incremental algorithm. It starts with a pseudo-inverse and null space basis for the generator matrix G in its workspace, and incrementally removes (simulates) a lost data or parity sector, while maintaining the pseudo-inverse and null space basis property at each step. This algorithm is space-efficient and, for most well-designed codes, has relatively few operations. It requires space in R only for the lost data sectors (there is no need to provide recovery formulas for parity sectors as these can easily be derived from the original formulas in the generator matrix—alternately, it will be clear to those skilled in the art how to add columns to the workspace for the parity sectors as well, and provide additional formulas for the parity that reflect simulated data loss).

This process is reversible so long as the pseudo-inverse has full rank; that is, at any step, it is possible to model recovery of data for lost data sectors (in any order) and compute a new pseudo-inverse and null space basis equivalent to one in which these sectors were never lost. Such a reversible algorithm may be implemented in state 640 of FIG. 6. An exemplary reversible algorithm is described in detail later.

In this algorithm, column operations are performed on a workspace matrix; this is equivalent to multiplying on the right by some simple matrices.

The lost data or parity sectors are viewed as indexing a row of R and B.

The input to the algorithm is the parity check matrix H and a list F of data or parity columns that are lost. The output is as described above.

Algorithm: Column-Incremental Construction

1. Construct a square workspace matrix W of size (N+P). In the first N columns and rows, place an identity matrix. In the last P columns, place the parity check matrix H. Let R represent the first N columns and B represent the last P columns of W, so $$W = (R|B), \text{ where initially, } B = B0 = H \text{ and } R = R0 = \begin{pmatrix} I \\ 0 \end{pmatrix}$$

2. For each lost sector in list F, perform the following operation:

(a) Let r indicate the row corresponding to this lost sector.
(b) Find any column b in B that has a one in row r. If none exists, zero any column in R that has a one in row r and continue to the next lost sector. (Note that by zero-ing these columns all of row r is zero-ed as well in W.)
(c) For each one in column c, say, of row r of W (both R and B portion), if c≠b, Sum and Replace column b into column c.
(d) Zero column b in B. (This is equivalent to adding column b to itself.)
(e) Continue to the next lost sector, until the list has been processed.

3 (Optional) Use the columns of B to improve the weight of non-trivial columns of R (corresponding to lost data sectors processed so far).

4. Output R (the first N columns of W) and the non-zero columns of B (from the last P columns of W).

End

A skilled artisan can easily determine that this algorithm solves the problem of providing a method for determining data loss events and recovery formulas for data of lost sectors with recoverable data. Such a determination or proof can be developed by replacing the column operations described in the algorithm by mathematical formulas involving simple matrix operations. Before giving an example, the following observations are noted.

The optimization step on R can be done in an optional penultimate step as indicated (equivalently as a post-processing step) or during the loop (after step (d)). Preferably, it is performed as a post-processing step, because at that point, the null space basis has minimal dimension (and so size), so the search space is smallest.

At Step 2b, there may (most likely will) be multiple choices. There is no known theory that states what criterion one should use so that the resulting R is optimal or near optimal. One heuristic is to use the column in B of minimal weight, but that has not always precluded a post processing optimizer step in testing. However, picking the one of minimal weight does imply the single new formula introduced for the lost sector is optimal at that step.

An alternative heuristic is the following: in the algorithm, a column b of B is chosen with a one in position r among all such columns of B. This selected column is then added to each of the others in this set. This suggests that an heuristic for selecting b among this set is to pick the column not of minimal weight as previously suggested, but the one that minimizes the total weight (or largest weight) of the resulting columns (if there are more than one such, pick the one of minimal weight among them). This leaves B at each step with good weight. In general, it is believed that the number of columns in the set is always at most the number of parity touched by the lost sector so long as no parity sectors are lost. This is the case in the initial state with the parity check matrix. In most 2-fault tolerant codes this is value is typically 2, in which case the one with minimal weight is also the one that satisfies any of the suggested alternative criteria.

- In the case of only data sectors, it is always the case that column c=r has a 1 in position r (and no other 1s elsewhere) so is always acted on in the key step. In fact, the result for this column is that this column is replaced by the parity column b and then the bit in position r is toggled off.
- After each lost sector in the list is processed, the matrix R is a (partial or complete) pseudo-inverse for a zero-ed generator matrix G0 that has exactly the columns zero-ed corresponding to exactly the set of sectors processed so far. This is clear in the first step because no sectors have been processed, G0=G, the generator matrix, R=R0 is essentially an identity matrix which extracts the identity portion of G and B=B0=H is the parity check matrix, that is. the null space basis for G. This implies that at the end of the algorithm, the matrices R and B have the required properties.
- The intermediate (or final) matrix G0 is never stored; it is handled implicitly, and so no space is used for this purpose.
- Because the algorithm operates on columns of R and B (of the workspace W), it is easy to see that the algorithm acts independently on each of the columns of R. This means that the algorithm can be modified to produce a formula for a single lost data sector (given the list of all lost sectors). The method is to replace the matrix R by the single column of interest. In other words, if essential in practice, one could implement the algorithm on a single column (e.g., to as quickly as possible generate a recovery formula for a single sector). For example, this method could be used in step 330 of process 300 in FIG. 3. This would be more expensive globally (if there was a need eventually to get all lost data formulas), but may be marginally more efficient locally (to get a single lost data formula).
- For the same reason as above, if only data sectors are lost, it is not necessary to have space for the complete matrix R, since only the columns associated to lost sectors are touched (the others stay identity columns).
- The method can be used in an on-line fashion to maintain the recovery formulas for lost data sectors as they are detected in the stripe, as described in FIG. 5 and FIG. 6. As each new loss is detected, the matrices R and B get updated. As each lost sector is recovered, the matrices can be updated again using the methods below, as described in FIG. 6. The optional optimization step might then be applied for each pass through the algorithm's main step. Alternatively, the algorithm can be applied after detection of (some or all of) the lost sectors in the stripe. Here, the optional optimization step would best be applied after the last lost sector is processed. The method may also be used in an off-line fashion as described in FIG. 3 and FIG. 4.
- An example is given in the next subsection.

Column-Incremental Construction Example

Start with the BR(3,5) code and assume that data sectors d00, d10, d02, d01 are lost from all three strips S0, S1 and S2. These sectors correspond to columns r=0, 1, 4, 2 of G (and so this set of rows in the workspace).

The initial workspace is given as:

$$W = (R|H) = (R|B) = \begin{pmatrix} 1 & 0 & 0 & 0 & 0 & 0 & | & 1 & 0 & 1 & 0 \\ 0 & 1 & 0 & 0 & 0 & 0 & | & 0 & 1 & 0 & 1 \\ 0 & 0 & 1 & 0 & 0 & 0 & | & 1 & 0 & 0 & 1 \\ 0 & 0 & 0 & 1 & 0 & 0 & | & 0 & 1 & 1 & 1 \\ 0 & 0 & 0 & 0 & 1 & 0 & | & 1 & 0 & 1 & 1 \\ 0 & 0 & 0 & 0 & 0 & 1 & | & 0 & 1 & 1 & 0 \\ 0 & 0 & 0 & 0 & 0 & 0 & | & 1 & 0 & 0 & 0 \\ 0 & 0 & 0 & 0 & 0 & 0 & | & 0 & 1 & 0 & 0 \\ 0 & 0 & 0 & 0 & 0 & 0 & | & 0 & 0 & 1 & 0 \\ 0 & 0 & 0 & 0 & 0 & 0 & | & 0 & 0 & 0 & 1 \end{pmatrix}$$

For r=0, select column b=6 (of minimal weight among the columns in B with a one in row 0) and add this to columns c=0 and c=8 (where there are ones in row 0), then zero column b=6. The result is:

$$W = \begin{pmatrix} 0 & 0 & 0 & 0 & 0 & 0 & | & 0 & 0 & 0 & 0 \\ 0 & 1 & 0 & 0 & 0 & 0 & | & 0 & 1 & 0 & 1 \\ 1 & 0 & 1 & 0 & 0 & 0 & | & 0 & 0 & 1 & 1 \\ 0 & 0 & 0 & 1 & 0 & 0 & | & 0 & 1 & 1 & 1 \\ 1 & 0 & 0 & 0 & 1 & 0 & | & 0 & 0 & 0 & 1 \\ 0 & 0 & 0 & 0 & 0 & 1 & | & 0 & 1 & 1 & 0 \\ 1 & 0 & 0 & 0 & 0 & 0 & | & 0 & 0 & 1 & 0 \\ 0 & 0 & 0 & 0 & 0 & 0 & | & 0 & 1 & 0 & 0 \\ 0 & 0 & 0 & 0 & 0 & 0 & | & 0 & 0 & 1 & 0 \\ 0 & 0 & 0 & 0 & 0 & 0 & | & 0 & 0 & 0 & 1 \end{pmatrix}$$

Next, for r=1, select column b=7, and add it to columns c=1 and c=9, then zero column b=7 to get:

$$W = \begin{pmatrix} 0 & 0 & 0 & 0 & 0 & 0 & | & 0 & 0 & 0 & 0 \\ 0 & 0 & 0 & 0 & 0 & 0 & | & 0 & 0 & 0 & 0 \\ 1 & 0 & 1 & 0 & 0 & 0 & | & 0 & 0 & 1 & 1 \\ 0 & 1 & 0 & 1 & 0 & 0 & | & 0 & 0 & 1 & 0 \\ 1 & 0 & 0 & 0 & 1 & 0 & | & 0 & 0 & 0 & 1 \\ 0 & 1 & 0 & 0 & 0 & 1 & | & 0 & 0 & 1 & 1 \\ 1 & 0 & 0 & 0 & 0 & 0 & | & 0 & 0 & 1 & 0 \\ 0 & 1 & 0 & 0 & 0 & 0 & | & 0 & 0 & 0 & 1 \\ 0 & 0 & 0 & 0 & 0 & 0 & | & 0 & 0 & 1 & 0 \\ 0 & 0 & 0 & 0 & 0 & 0 & | & 0 & 0 & 0 & 1 \end{pmatrix}$$

For r=4, select column b=9, add it to c=4, then zero column b=9 to g et:

$$W = \begin{pmatrix} 0 & 0 & 0 & 0 & 0 & 0 & | & 0 & 0 & 0 & 0 \\ 0 & 0 & 0 & 0 & 0 & 0 & | & 0 & 0 & 0 & 0 \\ 0 & 0 & 1 & 0 & 1 & 0 & | & 0 & 0 & 1 & 0 \\ 0 & 1 & 0 & 1 & 0 & 0 & | & 0 & 0 & 1 & 0 \\ 0 & 0 & 0 & 0 & 0 & 0 & | & 0 & 0 & 0 & 0 \\ 1 & 1 & 0 & 0 & 1 & 1 & | & 0 & 0 & 1 & 0 \\ 1 & 0 & 0 & 0 & 0 & 0 & | & 0 & 0 & 1 & 0 \\ 1 & 1 & 0 & 0 & 1 & 0 & | & 0 & 0 & 0 & 0 \\ 0 & 0 & 0 & 0 & 0 & 0 & | & 0 & 0 & 1 & 0 \\ 1 & 0 & 0 & 0 & 1 & 0 & | & 0 & 0 & 0 & 0 \end{pmatrix} \quad (7)$$

Note that this agrees with R in the example above.

For r=2, select column b=8 (the only choice), add it to c=2 and c=4, then zero column b=8 to get:

$$W = \begin{pmatrix} 0 & 0 & 0 & 0 & 0 & 0 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \\ 0 & 1 & 1 & 1 & 1 & 0 & 0 & 0 & 0 & 0 \\ 0 & 0 & 0 & 0 & 0 & 0 & 0 & 0 & 0 & 0 \\ 1 & 1 & 1 & 0 & 0 & 1 & 0 & 0 & 0 & 0 \\ 1 & 0 & 1 & 0 & 1 & 0 & 0 & 0 & 0 & 0 \\ 1 & 1 & 0 & 0 & 1 & 0 & 0 & 0 & 0 & 0 \\ 0 & 0 & 1 & 0 & 1 & 0 & 0 & 0 & 0 & 0 \\ 1 & 0 & 0 & 0 & 1 & 0 & 0 & 0 & 0 & 0 \end{pmatrix}$$

So far no data loss has occurred (even though sectors have been lost in more than two strips). Also, there are no non-zero null space basis vectors. This means that the reconstruction formulas in R are unique (and therefore optimal).

In addition, any column for a data sector that is not lost has remained unchanged as an identity column.

It can be checked that at each stage the claimed properties of pseudo-inverse and null space of the intermediate results all hold (this is not against the final G0 but the intermediate G0 that are maintained only implicitly).

If it is further assumed that data sector d11 corresponding to r=3 is lost, then the result is just to zero columns c=1, 2, 3, 4. This means that there is data loss event for these four sectors but the data in sector d00 for c=0 is still recoverable and sector d12 for c=5 was never lost.

Other Algorithms

In this section, other algorithms are outlined that provide similar functions to the column-incremental construction.

There is a row variation on the column-incremental construction. In this algorithm, the key step selects a column b from B, but instead of column operations, it adds row r to every row with a one in b, then zeros row r. It can be shown that this produces identical results to the preferred embodiment. In practice, for array erasure codes, it appears that the column algorithm is generally more efficient because typically the weight for row r is significantly less than weight of column b; so there are fewer operations to perform. It appears (without proof) that if the code has T-fault tolerance and only data sectors are lost, then the row weight is always T+1 (or one if the data is a data loss event), though the column weight would be at least the parity in-degree for the parity values.

Another algorithm is based on standard methods in linear algebra for computing the inverse of a matrix: zero all the columns of G corresponding to lost sectors in G to get G0, then perform column operations on G0 and mirror those operations on a matrix whose initial state is an identity matrix. This method incorporates into the initial data structures all the information about lost sectors. Such a method is applicable to the formula generating unit 265 in FIG. 2 as applied in step 330 of process 300 in FIG. 3 or step 430 of process 400 in FIG. 4.

As before, there is a row-operation based version of this algorithm as well. These variations are more static (off-line) in that it needs the complete set of lost data sectors in the initial step. It also requires extra workspace as the G0 matrix must be constructed explicitly and manipulated along with the result workspace.

For the reasons stated here, the column-incremental construction is the preferred embodiment of the invention.

Reversing the Incremental Construction

The incremental process can be used to start with a fully on-line stripe and, step by step, as lost sectors are detected or identified in the stripe, maintain a set of recovery formulas (or a declaration of unrecoverability—data loss event) for every data sector in the stripe. As new lost sectors are detected, the matrices are updated and new formulas are generated. This is the method that this described in process 500 in FIG. 5 and process 600 in FIG. 6.

It might be useful to reverse the process, as indicated in process 600 of FIG. 6 through the transition from state 690 to state 640. Suppose the array has had some set of lost sectors, but no data loss events yet. Suppose the data for a lost data sector is in fact recovered by its formula in R, as in state 690 of process 600. If this recovered data is replaced in the stripe, it might be helpful to update the formulas to reflect this. There are two reasons for this. First, it is clear that the formula in R can be replaced by an identity column (no longer need the old formula). But secondly, it may be the case that other lost sectors can be recovered by better (more efficient) formulas that refer to the data of this newly recovered sector; R should be updated to reflect this fact.

One approach would be to use any algorithm (e.g., the one given above) to recompute the formulas for the revised set of lost sectors, starting from the "good" state, as in process 300 of FIG. 3 or process 400 of FIG. 4. However, a more efficient approach might be to attempt a reversal of the incremental process; that is, to update R and B directly to reflect the fact that the data for this lost sector has been recovered (e.g., its column in R is replaced by an identity column).

To reverse the incremental construction above, it must be the case that no information (in the information theoretic sense) is lost through each step. Mathematically, this happens whenever a matrix operation (row or column) is performed that is not invertible, i.e., that corresponds to multiplication by a non-invertible matrix. This occurs essentially in only one place in the construction: when there is no vector in the null space basis with a one in the desired row. This corresponds exactly to the case of data loss events.

Consequently, the following result holds: So long as the data loss branch of the algorithm is never taken, then (in principle), the sequence of steps can be reversed. The algorithm given below works even after data loss events, so long as data for the restored sector has a recovery formula in R, that is, is not itself a data loss event. Additionally, it unreasonable to consider restoring into the matrix a sector corresponding to a data loss event since this assumes that the restored data is consistent with the still-remaining parity; this can not happen in general because the only source of that consistency is the known parity and they are, by assumption, insufficient to restore this data—that is, there is irretrievable loss in the information theoretic sense. Consequently, restoration in this case requires a full stripe write and a restoration to the initial "all good" state.

This reverse construction is described in the following algorithm.

The input to this algorithm is a workspace matrix W=(R|B) generated by the incremental algorithm and having the property that $$G0 \cdot W = (I|0)$$

where G0 is the original generator matrix with zero-ed columns for each data or parity sector in the list F of the input to the incremental algorithm. (Actually, G0 need only be maintained implicitly.) The other input is a data sector index, that is, a row number $r \leq N$ of W (or a column of G0 that is all-zero). The output of the algorithm is a revised matrix W so that the above formula holds with G0 having column r replaced by the identity column. The new matrix W will have an identity column in position r. Note that this process does not depend on which sector is being restored from among the set of sectors removed during the incremental phase (that is, it need not be the last sector removed).

The algorithm assumes that B contains enough all-zero columns so that it has P columns in total.

If the restored sector is not from the set F, then this algorithm has no work to do, so it is assumed without loss of generality that the lost sector is from F.

Remark: In this section, only the case of restoring data for lost data sectors (data columns from G0) is considered, and not parity sectors. The parity sector case is described in detail below.

Algorithm: Reverse Incremental Construction 1. (Optional) For each column c in the inverse portion of W (first N columns) that has a one in every row that column r has (that is, if the AND of the columns c and r equals column r), do the following:
   (a) For each position of column r that has a one, set the corresponding value in column c to zero (that is, replace column c by the sum of r and c).
   (b) Set position r in column c to the value 1.

2. Find any all-zero column b in B, the null space portion of W (that is, in the last P columns).

3. Set position (r, r) and (r, b) in W to the value 1.

4. Swap columns r and b of W.

5. (Optional) Use the null space basis vectors in B of W to reduce the weight of any column in the inverse portion R of W.

6. Return the updated W.

End

This algorithm works because it takes the recovery formula for the recoverable data of a lost sector and unfolds it back into the null space basis, then replaces the formula with an identity column.

The first optional step replaces any occurrence of the (sub) formula in the original W for data sector r by that sector itself. In particular, it restores to some formulas for other columns (associated to data sectors) a dependence on the restored data's sector. In the process, it improves the weight of these formulas.

This algorithm does not necessarily completely reverse the incremental algorithm in that it does not necessarily produce identical matrices going backward as were seen going forward. However, the difference will always be something in the null space.

In the next subsection, an example is given. A skilled artisan can determine that this algorithm satisfies the required properties by replacing the steps of the algorithm by matrix operations.

Reverse Incremental Construction Example

Start with the result of the incremental construction example in equation (7) (after loosing only r=0, 1, 4):

$$W = \begin{pmatrix} 0 & 0 & 0 & 0 & 0 & 0 & | & 0 & 0 & 0 & 0 \\ 0 & 0 & 0 & 0 & 0 & 0 & | & 0 & 0 & 0 & 0 \\ 0 & 0 & 1 & 0 & 1 & 0 & | & 0 & 0 & 1 & 0 \\ 0 & 1 & 0 & 1 & 0 & 0 & | & 0 & 0 & 1 & 0 \\ 0 & 0 & 0 & 0 & 0 & 0 & | & 0 & 0 & 0 & 0 \\ 1 & 1 & 0 & 0 & 1 & 1 & | & 0 & 0 & 1 & 0 \\ 1 & 0 & 0 & 0 & 0 & 0 & | & 0 & 0 & 1 & 0 \\ 1 & 1 & 0 & 0 & 1 & 0 & | & 0 & 0 & 0 & 0 \\ 0 & 0 & 0 & 0 & 0 & 0 & | & 0 & 0 & 1 & 0 \\ 1 & 0 & 0 & 0 & 1 & 0 & | & 0 & 0 & 0 & 0 \end{pmatrix}$$

This is the BR(3,5) code with loss of data sectors d00, d10, d02 in columns r=0, 1, 4. Suppose the data for data sector d10 of column r=1 has been recovered (and replaced from the actual data parity in the stripe as in step 350 of process 300 in FIG. 3 or in step 450 of process 400 of FIG. 4). The algorithm above has the following steps. (The optional step is included for completeness.)

First, examine each of the first six columns to see if column r=1 is contained in it. There are no such cases, so this step has no work.

Next select the all-zero column b=7 and set position 1 in this column and in column r=1 to the value 1, then swap these two columns:

$$W = \begin{pmatrix} 0 & 0 & 0 & 0 & 0 & 0 & | & 0 & 0 & 0 & 0 \\ 0 & 1 & 0 & 0 & 0 & 0 & | & 0 & 1 & 0 & 0 \\ 0 & 0 & 1 & 0 & 1 & 0 & | & 0 & 0 & 1 & 0 \\ 0 & 0 & 0 & 1 & 0 & 0 & | & 0 & 1 & 1 & 0 \\ 0 & 0 & 0 & 0 & 0 & 0 & | & 0 & 0 & 0 & 0 \\ 1 & 0 & 0 & 0 & 1 & 1 & | & 0 & 1 & 1 & 0 \\ 1 & 0 & 0 & 0 & 0 & 0 & | & 0 & 0 & 1 & 0 \\ 1 & 0 & 0 & 0 & 1 & 0 & | & 0 & 1 & 0 & 0 \\ 0 & 0 & 0 & 0 & 0 & 0 & | & 0 & 0 & 1 & 0 \\ 1 & 0 & 0 & 0 & 1 & 0 & | & 0 & 0 & 0 & 0 \end{pmatrix}$$

Next look for null space basis vectors that might improve the inverse portion. For example, the weight of column 0 is now 4. If columns 0 and 7 are combined (XORed) into column 0, a new matrix is obtained:

$$W = \begin{pmatrix} 0 & 0 & 0 & 0 & 0 & 0 & | & 0 & 0 & 0 & 0 \\ 1 & 1 & 0 & 0 & 0 & 0 & | & 0 & 1 & 0 & 0 \\ 0 & 0 & 1 & 0 & 1 & 0 & | & 0 & 0 & 1 & 0 \\ 1 & 0 & 0 & 1 & 0 & 0 & | & 0 & 1 & 1 & 0 \\ 0 & 0 & 0 & 0 & 0 & 0 & | & 0 & 0 & 0 & 0 \\ 0 & 0 & 0 & 0 & 1 & 1 & | & 0 & 1 & 1 & 0 \\ 1 & 0 & 0 & 0 & 0 & 0 & | & 0 & 0 & 1 & 0 \\ 0 & 0 & 0 & 0 & 1 & 0 & | & 0 & 1 & 0 & 0 \\ 0 & 0 & 0 & 0 & 0 & 0 & | & 0 & 0 & 1 & 0 \\ 1 & 0 & 0 & 0 & 1 & 0 & | & 0 & 0 & 0 & 0 \end{pmatrix}$$

where the new column 0 also has weight 4. No improvement was made but an equivalent result is obtained and now sector r=1 is used in the formula for r=0.

Note that the final result has an identity column in position 1 so this data sector has been (logically) restored to the stripe as well as to the recovery formulas for other lost data sectors.

Restoring Parity Sectors

It is possible to add a parity sector back in to the matrices, but it requires the original parity column from the generator matrix G (for the data columns, it is known a priori that this column is an identity column so there is no need to keep track of this externally). Suppose that this parity is indexed by column c in G.

Take this parity column and for each 1 in the column, sum together (modulo 2) the corresponding columns of R in W and place the result in an all-zero column of B in W. (This is exactly what occurs above since there was only one such column!) Replace the zero in position c of this new column by 1. Replace column c of G0 by this parity column (restore it). (Again, this is exactly what was done for a restored data column, except it was also necessary to set the (r, r) position in the inverse portion of W to 1—in the case of a parity column, no such position exists in the inverse portion so this step is skipped.) A skilled artisan can determine that this process meets the requirements.

The system and method according to the exemplary aspects of the present invention can be used to easily describe loss of scattered sectors (or elements) in arbitrary array codes, both as an on-line (dynamic) method as in FIG. 5 and FIG. 6 or as an off-line (static) method as in FIG. 3 and FIG. 4.

A preferred aspect of the invention implements the column-incremental construction. However, other constructions are outlined and others may also be determined by those skilled in the art.

A method according to an exemplary aspect of the present invention determines whether the data from lost sectors can be recovered from the current known data and parity, and if so, provides formulas for the recovery. An additional feature of the exemplary aspects of the invention is the reverse construction that can update the formulas when formerly lost data (or parity) sectors are have their data recovered and restored into the stripe.

Thus, the illustrative, non-limiting aspects of the present invention as described above, overcome the problems of the conventional methods and systems, and provide exemplary methods and systems for determining lost sector data recovery formulas in a storage system.

While the invention has been described in terms of several preferred embodiments, those skilled in the art will recognize that the invention can be practiced with modification within the spirit and scope of the appended claims.

Further, it is noted that, the inventors' intent is to encompass equivalents of all claim elements, even if amended later during prosecution.

What is claimed is:

1. A method for a lost sector data recovery in a storage system employing an exclusive-OR erasure code across a plurality of disks, the method comprising:
determining, using a processor, a set of readable sectors and a set of lost sectors in said plurality of disks in said storage system;
identifying, using said processor, a first lost sector in said set of lost sectors; and
determining, using said processor, whether data from said first lost sector is capable of being recovered from the data stored on the readable sectors or is not capable of being recovered, based on a binary parity check matrix of said exclusive-OR erasure code.

2. The method according to claim 1, further comprising:
if the data from said first lost sector is capable of being recovered, generating a first recovery formula for recovering the data from said first lost sector.

3. The method according to claim 2, wherein said generating said first recovery formula implements a binary matrix pseudo-inverse algorithm.

4. The method according to claim 2, further comprising:
if the data from said first lost sector is capable of being recovered, generating said first recovery formula using a pseudo-inverse construction; and
recovering the data from the first lost sector.

5. The method according to claim 4, further comprising:
generating a second recovery formula for data from a second lost sector based at least in part on said recovered data from said first lost sector.

6. The method according to claim 4, further comprising:
replacing the data from said first lost sector based on a result of said recovery.

7. The method according to claim 6, further comprising:
identifying a second lost sector of at least one disk of said storage system; and
determining whether data of said second lost sector is capable of being recovered based on said replaced data from said first lost sector.

8. The method according to claim 7, further comprising:
if data of said second lost sector is capable of being recovered, generating a second recovery formula for the data of said second lost sector.

9. The method according to claim 8, further comprising:
generating said second recovery formula for said data from said second lost sector based at least in part on said recovered data from said first lost sector.

10. The method according to claim 8, further comprising:
recovering the data of said second lost sector based on said second recovery formula for said data of said second lost sector.

11. The method according to claim 10, further comprising:
replacing the data from said second lost sector based on a result of said recovery of said data of said second lost sector.

12. The method according to claim 1, further comprising:
if the data from said first lost sector is determined as capable of being recovered, using said processor to recover the data from said first lost sector.

13. The method according to claim 1, wherein said first lost sector includes lost data comprising at least one of recoverable lost data and unrecoverable lost data.

14. The method according to claim 13, wherein, if said first lost sector includes unrecoverable lost data, said method further comprises declaring a data loss event.

15. The method according to claim 1, wherein said storage system comprises at least one of a storage device, a plurality of storage nodes, a storage network, and a disk array.

16. The method according to claim 1, wherein said storage system comprises a redundant array of inexpensive disks (RAID) disk array.

17. The method according to claim 1, wherein said first lost sector includes a plurality of lost sectors.

18. A lost sector data recovery system in a storage system employing an exclusive-OR erasure code across a plurality of disks, the lost sector data recovery system comprising:
means for determining a set of readable sectors and lost sectors in a plurality of disks in said storage system;

means for identifying a first lost sector of at least one disk of said storage system; and means for determining whether data from said first lost sector is capable of being recovered from the data stored on the readable sectors or is not capable of being recovered, as based on a binary parity check matrix of said exclusive-OR erasure code.

19. The system according to claim 18, further comprising:
means for recovering the data from said first lost sector which is determined to be capable of being recovered.

20. A lost sector data recovery system in a storage system employing an erasure code across a plurality of disks, the lost sector data recovery system comprising:

a first determining unit that determines a set of readable sectors and lost sectors in a plurality of disks in said storage system, an identifying unit that identifies a first lost sector of at least one disk of said storage system;

a second determining unit that determines whether data from said first lost sector comprises recoverable data or, alternatively, cannot be recovered, as based on a parity check matrix of said erasure code;

a generating unit that generates a first recovery formula for recovering the data from said first lost sector;

a recovering unit that recovers said data from said first lost sector based on said first recovery formula; and a replacing unit that replaces said data from said first lost sector based on a result of said recovering, wherein said identifying unit identifies a second lost sector of at least one disk of said storage system, wherein said second determining unit determines whether data from said second lost sector comprises recoverable data based at least in part on said recovered data from said first lost sector wherein said generating unit generates a second recovery formula for recovering the data from said second lost sector based at least in part on said recovered data from said first lost sector, wherein said recovering unit recovers said data from said second lost sector based on said second recovery formula, and wherein said replacing unit replaces said data from said second lost sector based on a result from said recovering unit.

21. The system according to claim 20, wherein said storage system comprises at least one of a storage device, a plurality of storage nodes, a storage network, and a disk array.

22. The system according to claim 20, wherein said storage system comprises a redundant array of inexpensive disks (RAID) disk array.

23. The system according to claim 20, wherein said identifying unit identifies a plurality of lost sectors.

24. A tangible signal-bearing storage medium tangibly embodying a program of machine-readable instructions executable by a digital processing apparatus to perform a method for a lost sector data recovery in a storage system employing an exclusive-OR erasure code across a plurality of disks, the method comprising:

determining a set of readable sectors and lost sectors in a plurality of disks in said storage system, identifying a lost sector of at least one disk of said storage system; and determining whether data from said lost sector is capable of being recovered from the data stored on the readable sectors or, alternately, cannot be recovered, as based from a binary parity check matrix of said exclusive-OR erasure code.

25. The signal-bearing storage medium according to claim 24, further comprising:

if said data from said lost sector is capable of being recovered, recovering said data from said lost sector.

26. A method of deploying computing infrastructure in which computer-readable code is integrated into a computing system employing an exclusive-OR erasure code across a plurality of disks, and combines with said computing system to perform a method for a lost sector data recovery in a storage system, the method comprising:

determining a set of readable sectors and lost sectors in a plurality of disks in said storage system;

identifying a lost sector of at least one disk of said storage system; and determining whether data from said lost sector is capable of being recovered from the data stored on the readable sectors or, alternately, cannot be recovered, as based on a binary parity check matrix of said exclusive-OR erasure code.

27. The method according to claim 26, further comprising:

if said data from said lost sector is capable of being recovered, recovering said data from said lost sector.

* * * * *